Patented Aug. 11, 1925.

1,549,436

UNITED STATES PATENT OFFICE.

WILFRED ERNEST BILLINGHAME, OF LEE, ENGLAND.

EMULSIVE AGENT AND THE MANUFACTURE THEREOF.

No Drawing.   Application filed May 15, 1925.   Serial No. 30,610.

*To all whom it may concern:*

Be it known that I, WILFRED ERNEST BILLINGHAME, a subject of the King of Great Britain and Ireland, and a resident of Grove Park, Lee, in the county of Kent, England, have invented certain new and useful Improvements in or Relating to Emulsive Agents and the Manufacture Thereof, of which the following is a specification.

It is already known to act upon proteins and protein containing substances (e. g. albumen and casein) with caustic alkali and to incorporate the resulting alkinated or soluble proteins or protein containing substances, or solutions thereof, in soap or to employ same as emulsifying agents in the preparation of aqueous emulsions of bituminous substances, resins, oils, waxes and the like.

The present invention has for its object to provide an improved emulsive agent by acting upon protein or protein containing substances with caustic alkali and it resides essentially in acting upon pure protein or a commercially pure protein of the degree of purity hereinafter specified with caustic potash or caustic soda in the manner and in the proportions also hereinafter indicated.

According to the invention an emulsive agent is produced by acting upon a pure protein, or a commercially pure protein containing not less than about 80% of pure protein, in a thoroughly wetted or soaked condition and in the presence of several times its own weight of water, with caustic potash or caustic soda at temperatures below about 140° F. so as to effect the dissociation of the protein without saponifying the resulting amido fatty acids to any appreciable extent, i. e. so as to obtain a product in which the COOH and the KOH (or NaOH) groups are co-existent and not in combination. The quantity of caustic alkali employed may vary between 50% and 100% of caustic potash or the equivalent of caustic soda reckoned on the weight of the pure protein or protein containing substance of the degree of purity indicated. The re-action can be completed in an hour at ordinary temperatures, i. e. without the application of external heat. External heat may be applied but the temperature must be kept below about 140° F. but preferably not less than 60° F.

By way of example, 10 parts (by weight) of blood albumen or casein in a state of fine division are placed in from 60 to 100, say 80 parts of water, and after soaking for 15 minutes are acted upon with 10 parts of triturated caustic potash or caustic soda, preferably caustic potash, which are added in triturated form to the mixture of water and blood albumen or casein. The re-action is completed in an hour with occasional stirring without the application of external heat.

The resulting liquid emulsive agent may be incorporated in any desired proportion in finished soap at the melting pots, or may be added to baths for washing and scouring cotton, linen and woollen fabrics, or may be used for the purpose of emulsifying oils, fats, wood tars, and bitumen and bituminous materials or compounds either natural or artificially prepared.

The incorporation of 10% of the improved emulsive agent in finished soap has been found to harden the soap and improve its lathering and cleansing properties.

Aqueous emulsions of oils, (mineral, animal and vegetable), and fats may be prepared by dissolving in the desired volume of water suitable proportions of the emulsive agent (e. g. from 1% to 5% calculated on the weight of the oil or fat), and then pouring the oil or melted fat into the mixture in a continuous stream during brisk stirring. Alternatively, the emulsive agent may be first mixed with the oil or melted fat and the mixture be subsequently added to the water.

Similarly, aqueous emulsions of wood tars may be prepared by dissolving the desired quantity of emulsive agent in the required volume of water and then adding the solution to the tar gradually during stirring or agitation.

In incorporating the emulsive agent in soap solutions, the emulsive agent may be poured into the soap solution which may be at any temperature from ordinary temperatures to boiling point and should be stirred or agitated until the emulsive agent is dissolved. In this way from 10 to 50% of the emulsive agent, reckoned on the weight of the soap, may be incorporated in soap solutions with corresponding increase of the emulsive properties of the solutions.

To prepare an aqueous emulsion of bituminous material, the latter is melted at a temperature of 220°–230° F. and has poured into, and thoroughly incorporated with, it during agitation, from 1% to 5% of the emulsive agent, reckoned on the weight of the bituminous material. There is then added to the mixture the necessary quantity of water to make the required volume of emulsion, the agitation being continued and the temperature maintained. The emulsion is afterwards cooled, preferably while agitation is continued, when it is ready for use.

The resulting aqueous bituminous emulsion may be sprayed or otherwise applied to the surfaces of roads, or be used as a binding medium in the making of roads by mixing it with, or otherwise applying it to, mineral aggregate, e. g. stone, gravel, sand and the like. The emulsion may also be used as a binding medium in the manufacture of briquettes of carbonaceous materials such as coal, coke, lignite, peat and the like by mixing the emulsion either while hot or in the cold with, or otherwise applying it to, the carbonaceous material and forming the material thus treated into briquettes. The emulsion may also be used as a paint, dip or preservative for covering metals, stone, wood, felt or roofing materials, or any materials or objects which are to be preserved and rendered waterproof.

What I claim as my invention and desire to secure by Letters Patent is:—

1. The process of producing an emulsive agent, which comprises mixing a substance containing at least 80% of pure protein, with several times its own weight of water, and acting upon the thus prepared protein with sufficient alkali to effect a dissociation of the protein into its amido fatty acids without saponifying the latter at a temperature below 140° F., and obtain a product in which the COOH and the alkali groups are co-existent and not in combination.

2. The process of producing an emulsive agent, which comprises mixing a substance containing at least 80% of pure protein with between 6 and 10 times its own weight in water, and acting upon this protein mixture with sufficient caustic alkali to effect a dissociation of the protein into its amido fatty acids without saponifying the latter at a temperature below 140° F. and obtaining a product in which the COOH and the alkali groups are co-existent and not in combination.

3. An emulsive agent comprising the unsaponified amido fatty acids dissociated from commercially pure protein and a co-existent alkali.

4. An emulsive agent comprising the unsaponified amido fatty acids dissociated from commercially pure protein by sufficient caustic alkali to effect the dissociation with the alkali present uncombined.

In witness whereof I have hereunto set my hand.

WILFRED ERNEST BILLINGHAME.